United States Patent [19]
Spencer

[11] Patent Number: 5,827,577
[45] Date of Patent: Oct. 27, 1998

[54] METHOD AND APPARATUS FOR APPLYING CATALYTIC AND/OR ADSORBENT COATINGS ON A SUBSTRATE

[75] Inventor: Michael D. Spencer, Somerset, N.J.

[73] Assignee: Engelhard Corporation, Iselin, N.J.

[21] Appl. No.: 755,423

[22] Filed: Nov. 22, 1996

[51] Int. Cl.[6] .................... B05D 1/28; B05D 1/32; B05C 17/04

[52] U.S. Cl. .................. 427/475; 427/282; 427/287; 427/305; 427/428; 118/213; 118/258; 101/170; 101/450.1

[58] Field of Search .................. 427/466, 469, 427/471, 261, 287, 288, 307, 282, 428, 475, 483, 208.4, 207.1, 208.8; 101/129, 450.1, 170; 502/400, 439; 118/211, 213, 258

[56] References Cited

U.S. PATENT DOCUMENTS

| | | | |
|---|---|---|---|
| 4,229,490 | 10/1980 | Frank et al. | 427/113 |
| 4,245,583 | 1/1981 | Schollkopf et al. | 118/259 |
| 4,347,269 | 8/1982 | Keep | 427/428 |
| 5,362,346 | 11/1994 | Bullock, Sr. | 156/205 |
| 5,466,651 | 11/1995 | Pfefferle | 502/304 |
| 5,512,324 | 4/1996 | Paulus et al. | 427/409 |
| 5,607,508 | 3/1997 | Westphal | 118/213 |

FOREIGN PATENT DOCUMENTS

| | | |
|---|---|---|
| 36 19 360 A1 | 12/1987 | Germany . |
| 44 33 328 A1 | 4/1995 | Germany . |
| 2 094 170 | 9/1982 | United Kingdom . |
| WO 89/00687 | 1/1989 | WIPO . |
| WO 95/32053 | 11/1995 | WIPO . |

OTHER PUBLICATIONS

METREON™ Product Brochure (1996) (4 pages).
John R. Adomaititis "Metal Converter Technology Using Precoated Metal Foil" SAE Tech. Paper Services Oct. 14–17, 1996 pp. 185–194.

*Primary Examiner*—Shrive Beck
*Assistant Examiner*—Fred J. Parker
*Attorney, Agent, or Firm*—Theodore J. Shatynski

[57] ABSTRACT

Methods and apparatus are disclosed for imprinting a catalyst and/or adsorbent composition on a flat or corrugated substrate. The coated substrate is useful in pollutant treating devices to remove pollutants from a gas.

26 Claims, 7 Drawing Sheets

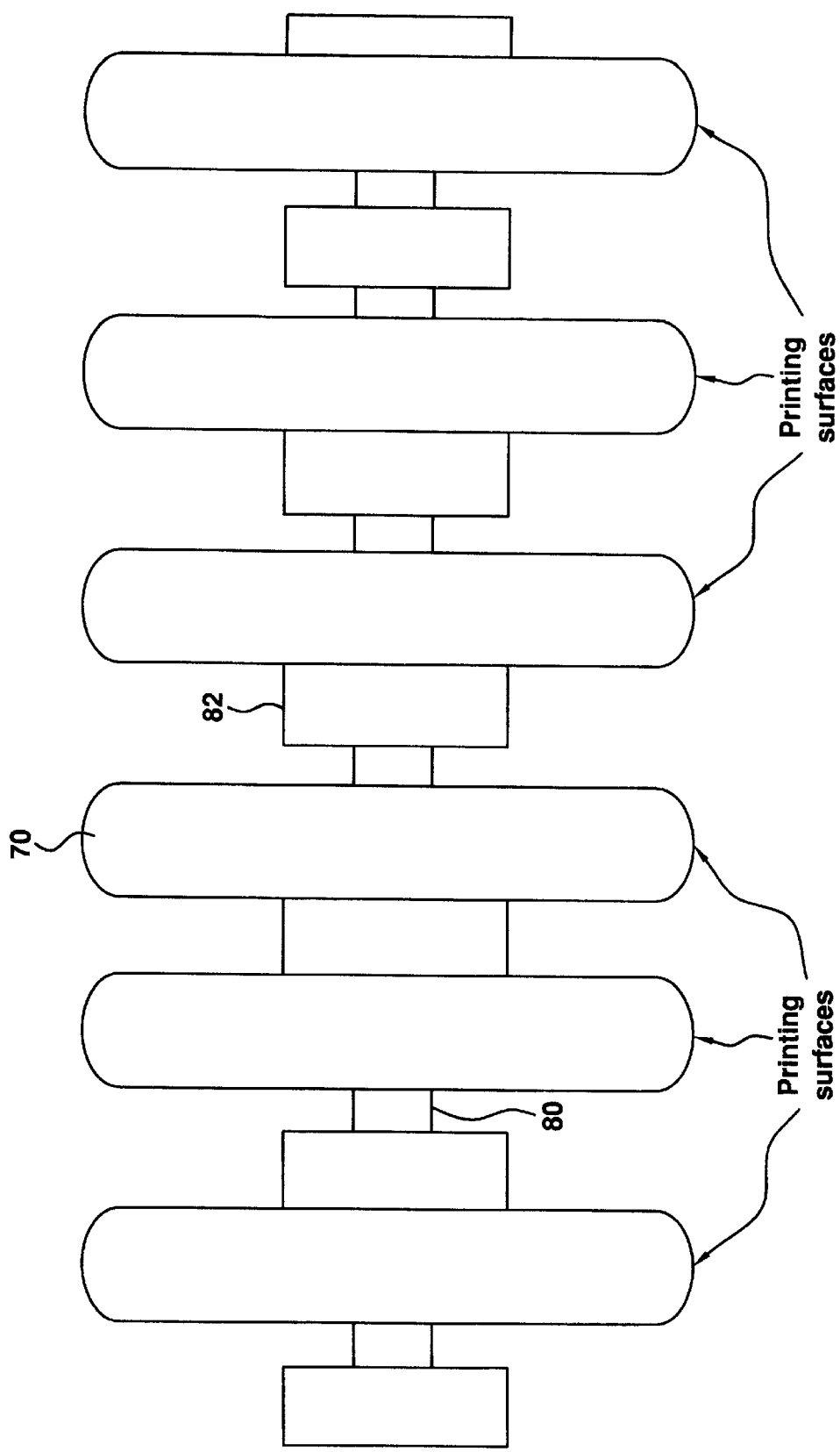

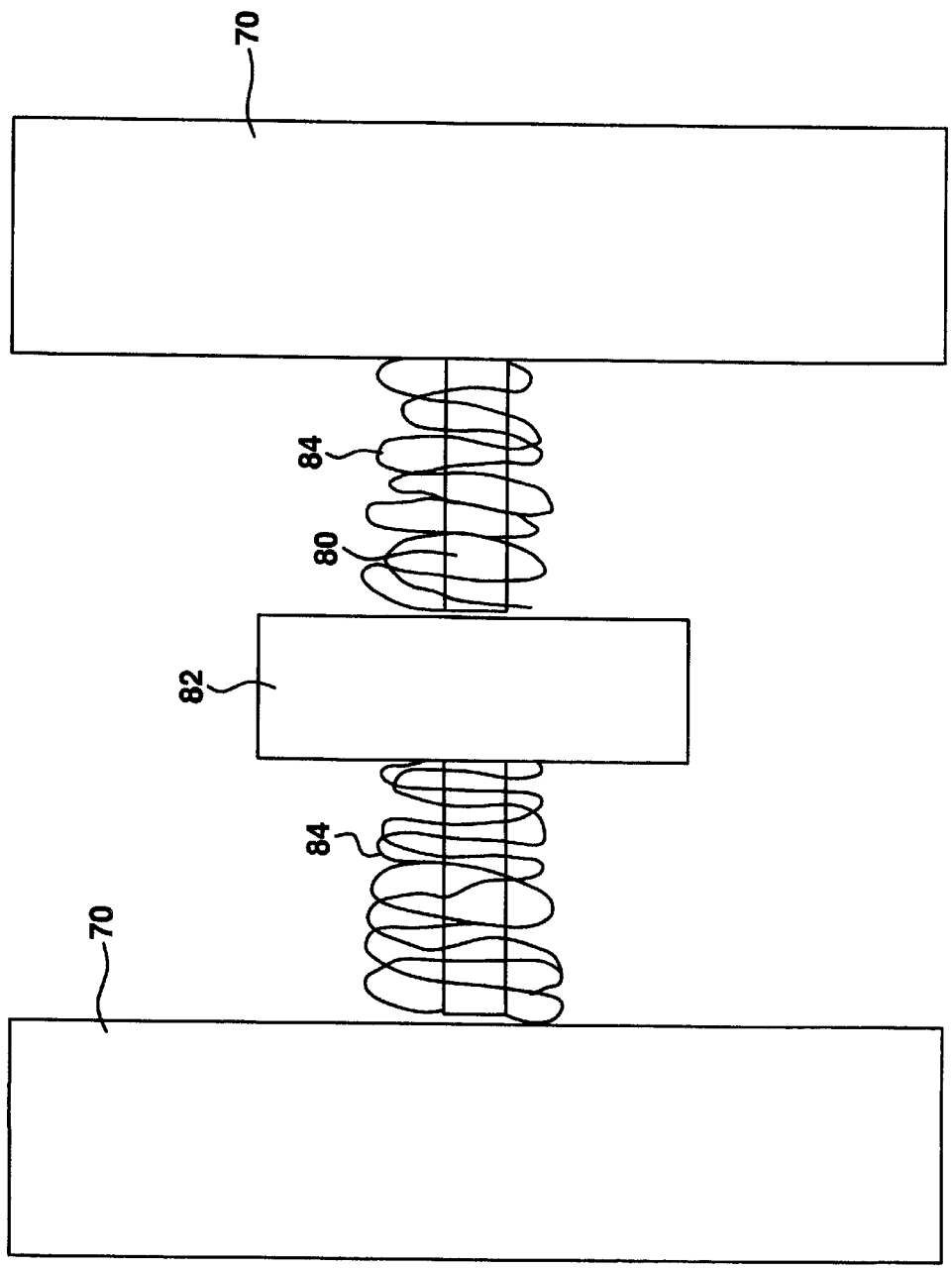

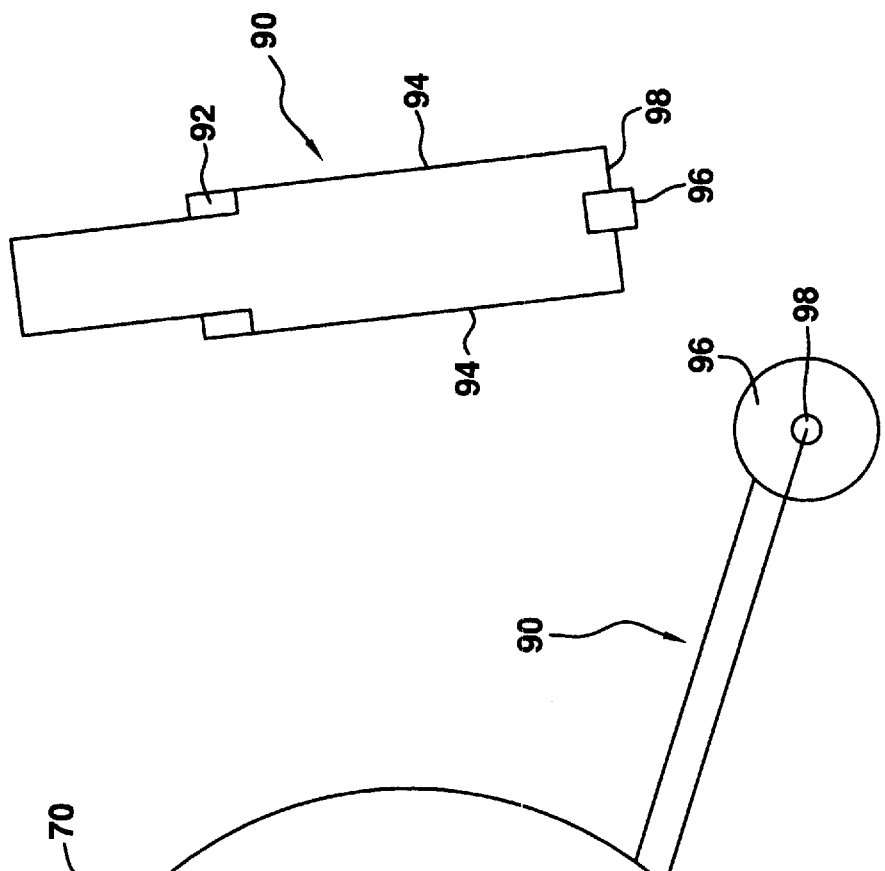
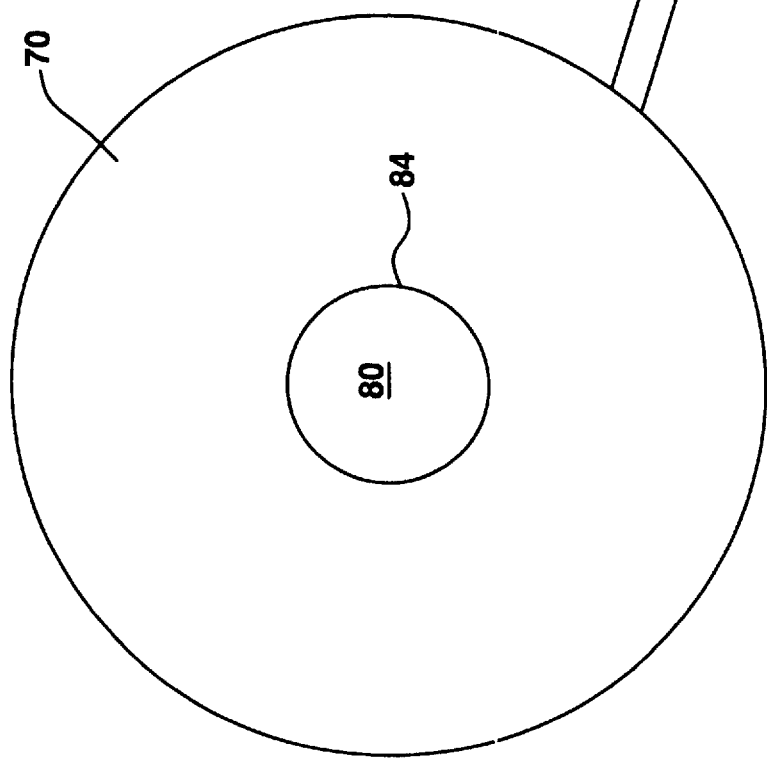

METHOD AND APPARATUS FOR APPLYING CATALYTIC AND/OR ADSORBENT COATINGS ON A SUBSTRATE

FIELD OF THE INVENTION

The present invention is directed to a method of coating a substrate having a variety of surface conditions such as, for example, flat, textured, corrugated or dimpled, using printing techniques which are superior to conventional dipping and spraying methods. The method is particularly applicable to the coating of substrates with a catalytic material or adsorbent for use in producing pollutant treating devices for removing pollutants from a gas.

BACKGROUND OF THE INVENTION

The removal of pollutants from a gas (e.g. engine exhaust or air) requires that the gas moves in proximity to a material that can either chemically convert the pollutants to non-toxic materials and/or absorb the pollutants so that the gas may be cleansed. In order to provide conditions for the removal of pollutants from gases, it is necessary to have a flow of gas and in some cases a source of heat to elevate the temperature of the gas flow to above a critical temperature particularly when using catalysts to promote chemical conversion of the pollutants.

Such devices employ catalytic materials to convert pollutants to non-toxic materials. Such catalysts include noble metal catalysts (e.g. platinum, palladium, rhodium and the like) as well as the less expensive base metal catalysts such as barium, strontium, zirconium, rare earth and alkaline earth metals and the like.

Systems employing catalysts for the removal of pollutants from gasoline and diesel exhaust are commonplace in the auto industry. Catalytic converters are devices which contain a catalytic material to promote the chemical conversion of such pollutants including hydrocarbons, carbon monoxide and nitrogen oxide to produce non-toxic gases such as carbon dioxide, water vapor and nitrogen. Catalytic converters of the type employed in the automotive industry to treat engine exhaust are expensive and not readily replaceable. They are typically provided with relatively high concentrations of very expensive catalysts so that replacement over the life of the automobile is preferably not necessary.

It is also known in the art to use adsorbents to entrap pollutants within a maze of interstitial spaces while allowing air to pass therethrough. Examples of such adsorbents include activated carbon, silica, zeolites (e.g. beta-zeolite) and the like.

More recently, compositions and devices have been developed for treating ambient air to remove pollutants contained therein. Such devices employ catalytic materials and/or adsorbents selected to operate at lower temperatures than catalytic converters.

Catalytic devices of the type employed to treat automotive exhaust and to remove pollutants from ambient air have a variety of different shapes including a monolith or a honey-comb design. The honey-comb design can be formed, for example, by coating a corrugated substrate (e.g. a metal foil) and a flat sheet of the same material with a slurry of a suitable catalyst or adsorbent composition. The slurry is typically applied by dipping or immersing the corrugated substrate and the flat sheet into a bath of a suitable composition. The combination of the corrugated sheet and the flat sheet is then rolled upon itself to form the monolith. In an alternative method, a preassembled honeycomb is coated by dipping or immersing the honeycomb into the bath or by drawing the coating material into the honeycomb.

This traditional dip coating technique suffers from a number of disadvantages. The slurry composition has a tendency to build up or become thicker in the corners than in the flat areas of the corrugations causing uneven distribution of the catalyst in preformed honeycombs. In addition, it is known that the solubility of precious metal can vary. Dipcoating therefore can result in the preferential leaching or absorption of metals which contributes to the uneven distribution of the precious metals between and/or within the substrates. Still further, preformed monoliths are difficult to coat by dipping the monolith into a bath of the catalyst slurry. The difficulty in coating increases as the cell density of the monolith increases. Commercial practical monoliths have cell densities up to about 600 cells/in$^2$.

More specifically, immersion of corrugated metal foils in slurries containing a catalytic material and/or adsorbent requires post removal of large amounts of excess slurry typically by the combination of gravity, air knives, and/or other mechanisms. Slurry registration is not possible without masking of the substrate. In addition, the rate at which the slurry can be applied to the substrate is limited by the rate the excess slurry can be removed.

The build-up of excess slurry in the corners of the substrate during immersion occurs due to capillary action. This build-up results in uneven catalyst distribution which leads to reduced catalytic performance. Furthermore, the difference in thermal expansion between the material forming the monolith (e.g. ceramic) and the catalyst coating contributes to thermal shock failure. In this regard, the thicker the catalyst coating in the corners, the greater the risk of failure from thermal shock.

Another conventional method of applying a catalyst composition and/or adsorbent to a substrate is by spraying. A slurry is formed of the desired material and the slurry is sprayed onto the substrate through a suitable nozzle or the like. Spraying also suffers from a number of disadvantages such as overspraying, abrasion of the nozzle, lack of coating uniformity, high cost of recycling precious metals, and the like.

More specifically, slurries of catalytic materials and/or adsorbents contain a high percentage of solids, typically containing alumina. Spraying of such slurries through an orifice results in erosion of the orifice walls which significantly affects slurry through-put and distribution thereof. Therefore frequent replacement of the orifices must be made. It is also necessary to overspray the substrate with slurry to obtain a uniform coating. Spraying requires multiple heads to insure uniform coating. Multiple heads allow for overlapping between spray fans which help reduce inhomogeneities across the coated zone. Therefore, some spray heads must be positioned so that some or nearly all of their spray fans fail to impact upon the target in order to insure homogeneous coatings at the edges. Reducing the number of spray heads increases the amount of spray that must miss the target to insure uniform coatings. The coating slurry which misses the target and that which rebounds from the surface must be recaptured for recycling. Overspraying results in problems of refeeding the excess slurry into the spray equipment and/or the reclamation of precious metal contained with the slurry.

It would therefore be a significant advance in the art of forming coated substrates if the coating could be applied to flat and non-flat surfaces (e.g. corrugated surfaces) in a manner which produces coatings in a cost efficient and effective manner, at greater production rates than previously obtained. It would be a further advance in the art if substrates could be coated with a catalytic and/or adsorbent material to be used for constructing a catalytic converter and/or a pollution treating device for removing pollutants from gases, especially ambient air.

SUMMARY OF THE INVENTION

The present invention is generally directed to a method and apparatus for coating a substrate which may be flat, corrugated, textured, dimpled and the like. In one aspect of the invention the substrate is corrugated so that it may be fabricated into a honeycomb or monolith design to construct a device suitable for treating, for example, automotive exhaust and/or ambient air to remove pollutants therefrom. The substrate is coated with a desirable catalyst and/or adsorbent composition using a coating apparatus and printing methods which provide a more uniform coating and much greater production rates than prior methods such as dipping and spraying.

The printing methods which can be employed in the present invention include roller printing, screen printing, flexography, inkjet printing, chemical vapor deposition, molecular vapor deposition, chemical etching, electrochemical deposition, meyer rod printing, electrophoresis, printing using engraved plates or cylinders, and lithography. Each of these printing techniques can be employed to apply a catalyst and/or adsorbent composition to a substrate.

The apparatus and method of coating a substrate in accordance with the present invention comprises printing on the substrate having a flat or non-flat (e.g. corrugated) surface by one of the above-enumerated printing techniques. Modifications to such printing techniques and coatings applied thereto, particularly to applications directed to the printing of catalyst and/or adsorbent compositions are also encompassed by the present invention.

In one aspect of the invention, the apparatus and method of coating a substrate in accordance with the present invention comprises contacting the substrate with a roller assembly, having a flat or corrugated surface covered with a suitable slurry such as one containing a pollutant treating composition (e.g. catalyst and/or adsorbent composition) while rotating the roller in a direction either transverse to or along the axis of the surface. The coated substrate, if it has a corrugated surface, may then be formed into a honeycomb or monolith pollutant treating device.

In another aspect of the invention, the method of coating the corrugated substrate comprises contacting the substrate with a roller assembly having a plurality of spaced-apart projections adapted to fit into the corrugation of said substrate, while rotating the roller transverse to or along the axis of the corrugations of the substrate, and forming the coated corrugated substrate into a honeycomb shape. The roller assembly can optionally be provided with spacers between adjacent rollers and/or a guide assembly in which a wheel moves along the corrugations in advance of the printing roller.

In a further aspect of the invention, the substrate is coated with a slurry of a catalyst and/or adsorbent composition by covering a screen with the composition which is placed over the substrate. The composition is then drawn over the screen bringing the composition in contact with the substrate to form a coating thereon.

In accordance with the present invention, printing of the pollutant treating composition on a substrate achieves very thin and uniform coatings on the order of from about 0.1 to 1,000 microns, preferably from about 0.1 to 100 microns, which can be applied at high rates of up to about 1,000 to 2,000 feet/min. As a result, uniform coatings are obtained at throughputs not possible with traditional dip coating and spraying techniques.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 5 is a top view of another embodiment of a roller assembly in accordance with the present invention;

FIG. 6 is an enlarged view of the spacer element employed in the embodiment of FIG. 5;

FIG. 7A is a top view of a roller used in another embodiment of the roller assembly employed in the present invention; and FIG. 7B is a side view of the roller shown in FIG. 7A.

DETAILED DESCRIPTION OF THE INVENTION

The present invention is directed to an apparatus and method of coating a substrate with a composition, preferably in the form of a slurry, especially one containing a catalyst and/or adsorbent composition. The substrate which can be flat, corrugated, textured, dimpled or the like can the be formed into a desirable shape such as a monolith or honeycomb to form a pollutant treating device for the treatment of gases such as automotive exhaust and air.

Figure 1:
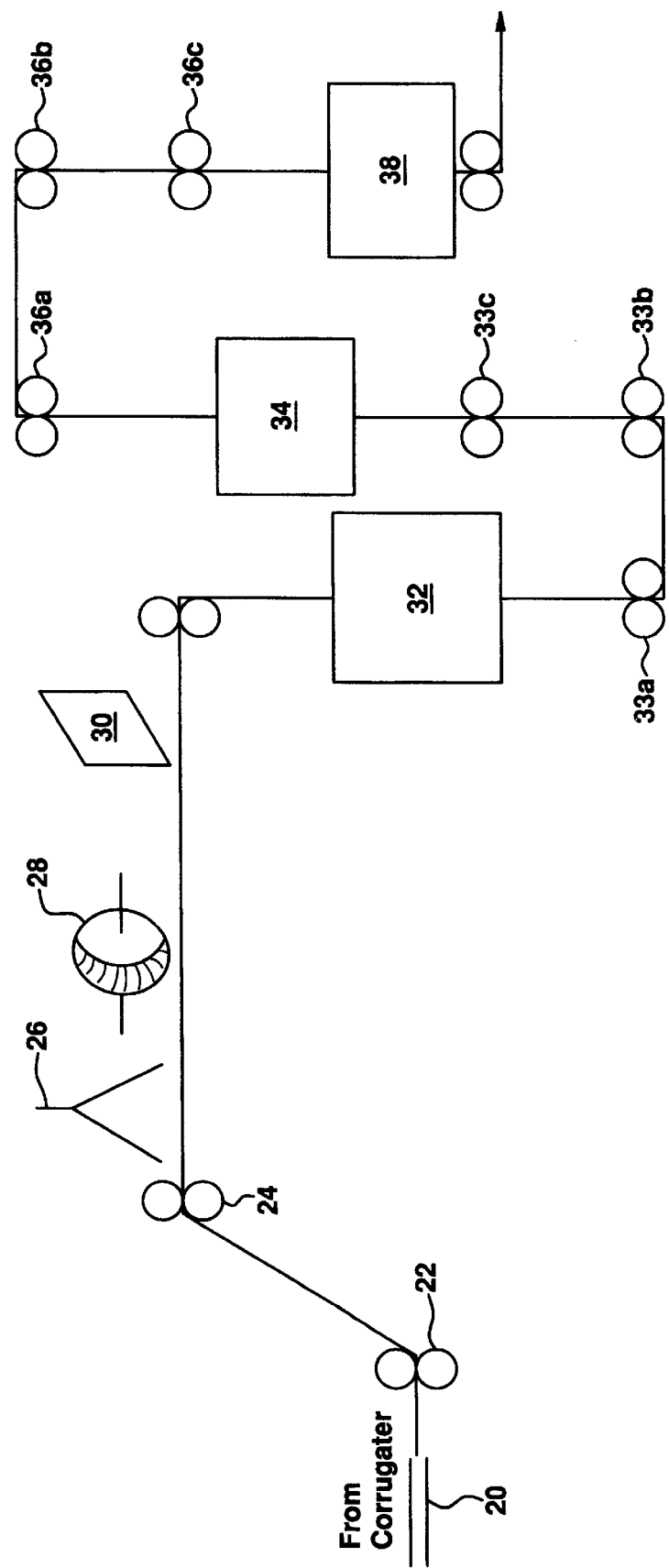
FIG. 1 is a schematic view of a system for forming a catalytic device having a honeycomb design employing the present invention.

The honeycomb design may be made, for example, by reference to FIG. 1 by passing a heated corrugated substrate from a conveyor 20 through a series of rollers 22 and 24. The substrate may be made from metal, plastic, paper products or composite materials. The selection of a suitable substrate depends in part on the severity of the conditions to which the substrate will be exposed. If made from metal, the substrate may be heated, for example, to up to about 950° C. for about 20 to 30 seconds to improve adhesion of the catalyst composition. FeCrAl alloys (e.g. Alpha-IV available from Allegheny Ludland) are particularly suited for the making of catalytic converters. Aluminum clad chromium steel is another preferred metal while woven polyaromatics (e.g. Nomex made by Dupont), polyethylene, polypropylene and nylon are suitable plastic materials.

The substrate is then pre-coated with aluminum or other suitable pre-coating material. Pre-coating may be accomplished by dipping, spraying or employing one of the printing techniques of the present invention as described hereinafter, such as, for example, by the use of a roller assembly, or screen printing and the like. As shown specifically in FIG. 1, the pre-coat is applied, for example, by a sprayer 26 and then brushed with a wire brush 28 to improve surface wetting and thereby improve surface adhesion. The catalyst and/or adsorbent composition is then applied. Coating typically takes place by applying from about 1 to 5 layers to allow the catalyst to build up on the substrate and to provide better adhesion thereto.

An air knife 30 or other suitable device is used to remove excess slurry and water from the substrate to help provide a smooth coating. The substrate is then dried and calcined in a dryer 32 and passed through a printing device such as, for example, a series of roller assemblies 33a–33c of the present invention to apply a first coating of the composition. The initially coated substrate is then dried and calcined in a dryer 34 and then a second catalyst coating is applied by roller assemblies 36a–36c also in accordance with the present invention. The fully coated substrate is then dried and calcined in a dryer 38 and then the substrate is rolled over itself into the shape of the eventual monolith. It will be understood that while three roller assemblies are shown to apply each coating of the catalyst composition, one or more roller assemblies may be used or another printing technique may be used as described hereinafter.

The printing techniques employed in the present invention provide an effective means of coating a substrate, especially with a slurry of a catalyst composition and/or an adsorbent composition. As used herein, roller printing shall mean applying the composition to a substrate using a soft roller, typically one having the roller surface covered with a synthetic or natural fabric. Typical rollers are those employed, for example, to apply paint to walls.

Screen printing, as previously indicated, involves the application of the composition to a porous screen and the drawing of the composition over the surface of the screen so that a coating of the composition is imprinted on the substrate.

Flexography employs a flexographic plate which is created through the use of ultraviolet (UV) curable resins. UV Radiation cures the resin and prevents removal during later processing. Areas not exposed to UV radiation are removed during processing. Microscopic pits are prepared on the surface of the resin and are adapted to receive the coating composition. Areas which do not have pits do not receive the composition. The image formed by the composition in the pitted area can be transferred directly to the substrate or first to an intermediate surface.

Inkjet printing employs an electric current applied selectively to a diode array positioned behind an orifice array. The heating of the diode array creates pressure that forces the coating composition through the orifice array. In another embodiment of inkjet printing, streams of the coating composition are electrically charged. The path of the droplets is controlled by controlling the electrical field applied thereto.

Chemical vapor deposition is performed generally by volatilizing the components of the coating composition so that the substrate is bathed in an atmosphere of the volatiles allowing for complete coverage of the substrate.

Molecular chemical vapor deposition is similar to chemical vapor deposition except that the volatile components do not have the same chemical composition as the deposited material. The volatile molecules decompose on the surface of the substrate to form the coating.

Chemical etching is a substrate printing technique in which areas of the substrate are protected while unprotected areas are subjected to chemical attack. The chemical etching material is any material that can be used to chemically etch the substrate such as acids and the like. The protective material can, for example, be a masking agent such as an etching material-impervious plastic (e.g. paraffins). For example, a photosensitive resin (e.g. PolyPlus S sold by Kissel & Wolf) is placed over the surface of a substrate and through a negative, UV light is radiated upon the substrate and a desired pattern is recorded. The thus treated resin can be removed from the substrate. The exposed areas of the substrate are then etched. Non-exposed areas are removed by an appropriate solvent. Both water soluble and organic solvents are available for this purpose.

Electrochemical deposition is a printing technique by which a substrate is treated to develop electrically conductive zones to allow for the reduction or oxidation of species at the substrate surface. Metal foil is the basis for the conductive zones. The application of insulators to the substrate creates non-conductive zones.

The substrate is then dipped into an ionic bath solution. The deposition of the coating including the amount and location is dependent on the location of the electrically conductive zones, the applied potential, and the ions present in the bath.

Wire printing or Meyer Rod printing is a printing technique which can be employed in the present invention. Different gauge wires when wound in a single layer around a rod produce spaces between the windings through which uniform coatings can be applied. A bead of the coating composition is maintained ahead of the rod as the same is applied to the substrate.

Electrophoresis is a process by which charged colloidal particles or molecules migrate through a solution under the influence of an applied electric field. The substrate is charged with an opposite polarity to the coating composition causing migration of the molecules to the substrate. The formation of the coating is controlled by the amount of electrical current, potential, viscosity and concentration of the coating composition and length of application.

Gravure printing, also known as intaglio printing, employs etched plates or cylinders. This form of printing is similar to flexography except that the image is carved into the substrate such as by laser, chemical and/or mechanical methods.

Lithography is a printing technique for use in the present invention by which hydrophobic and hydrophilic areas are created upon a substrate. The coating composition is applied to the areas with only one of the areas retaining the composition while the other area repels the compositions. The image is the transferred to the roller which can be applied to the substrate to be coated.

Figure 2:
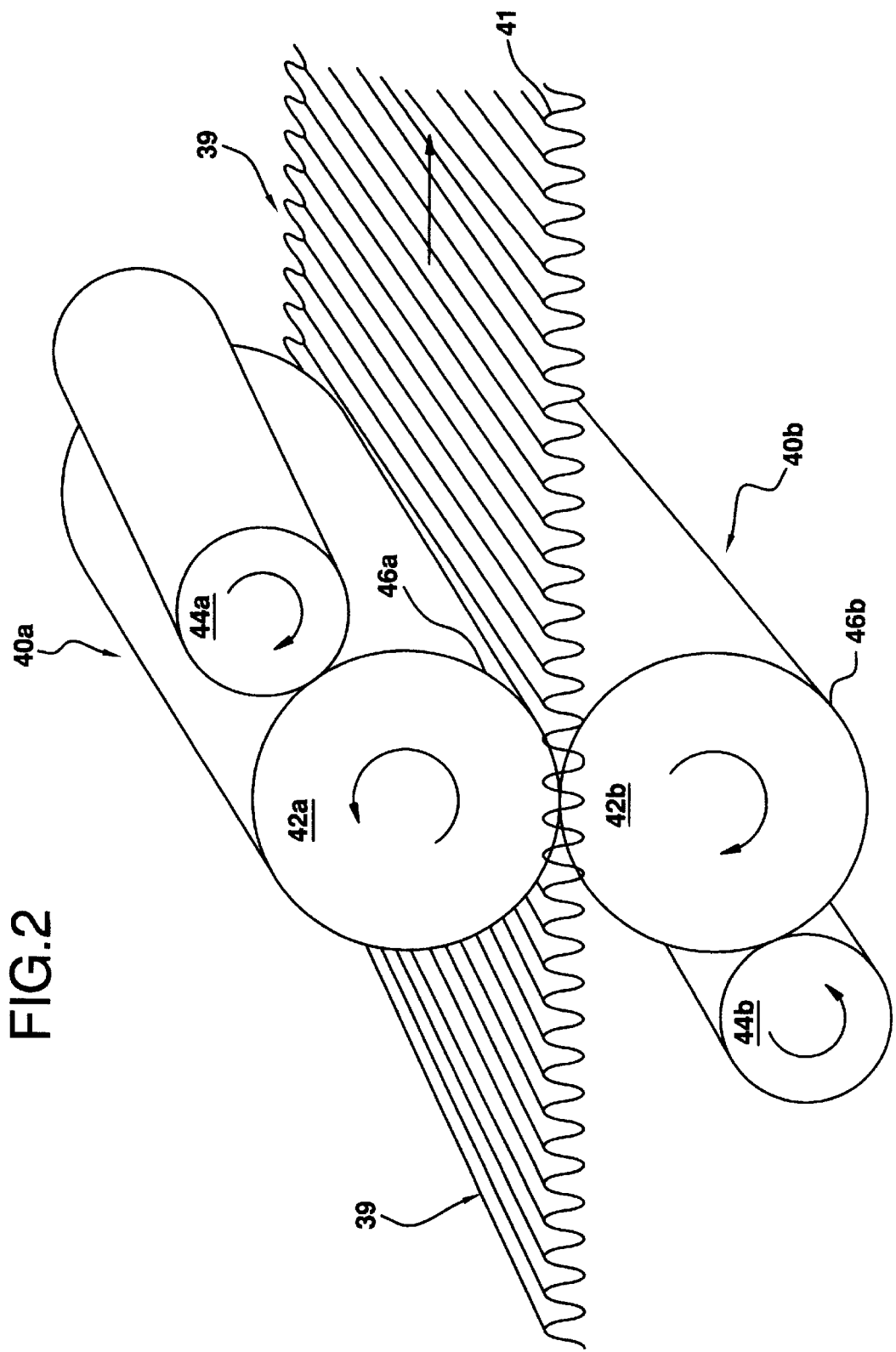
FIG. 2 is one embodiment of a roller assembly for applying a catalyst composition to a corrugated substrate in accordance with the present invention.

A preferred printing technique is the use of a roller assembly. The preferred roller assembly and method of applying a catalyst composition or adsorbent composition is shown in FIGS. 2–7B. Referring first to FIG. 2, there is shown a first embodiment of the invention with the rollers running either with or transverse to the corrugations (i.e. against the grain). By way of example, the embodiment shown in FIG. 2 depicts the rollers transverse to the corrugations.

Upper and lower roller assemblies 40a and 40b are employed to coat both sides of a substrate having spaced apart corrugations 41. The respective roller assemblies 40a and 40b include principle rollers 42a and 42b, respectively which applies the composition to the substrate 39 and secondary rollers 44a and 44b which apply and smooth the composition on the surface of the primary rollers 42a and 42b. The slurry containing the composition is supplied to the secondary rollers 44a and 44b by spray systems, rollers and the like (not shown).

As shown in FIG. 2, the roller assemblies 40a and 40b are rolled in a direction (see the arrow) transverse to the axis of the corrugations 41 (i.e. against the grain). The primary rollers 42a and 42b are made of a soft pliable material which conforms to the shape of the corrugations 41 as the roller passes over the substrate 39. Examples of such roller materials include shags, felts, synthetic foams and rubbers which can be made of nylon, polyurethane, polyethylene, polypropylene and the like. The preferred roller material is nylon. The secondary rollers 44a and 44b may be made of the same or similar materials.

Textured materials for the primary rollers are preferred because they create three dimensional coatings having a larger surface area/mass ratio. Coarse textured materials such as shags and finer textured materials such as felts can therefore be selected to optimize access to the substrate. This improves coating performance by reducing the problem of diffusion through the top coating of the composition and provides control over the surface/mass ratio.

As shown specifically in FIG. 2, pressure is applied to the primary rollers 42a and 42b so that the respective outer surfaces thereof 46a and 46b encompass approximately one half of the height of the corrugations 41. The combination of the pair of primary rollers 42a and 42b therefore provides a smooth even coat over the entire corrugated substrate 39.

Figure 3:
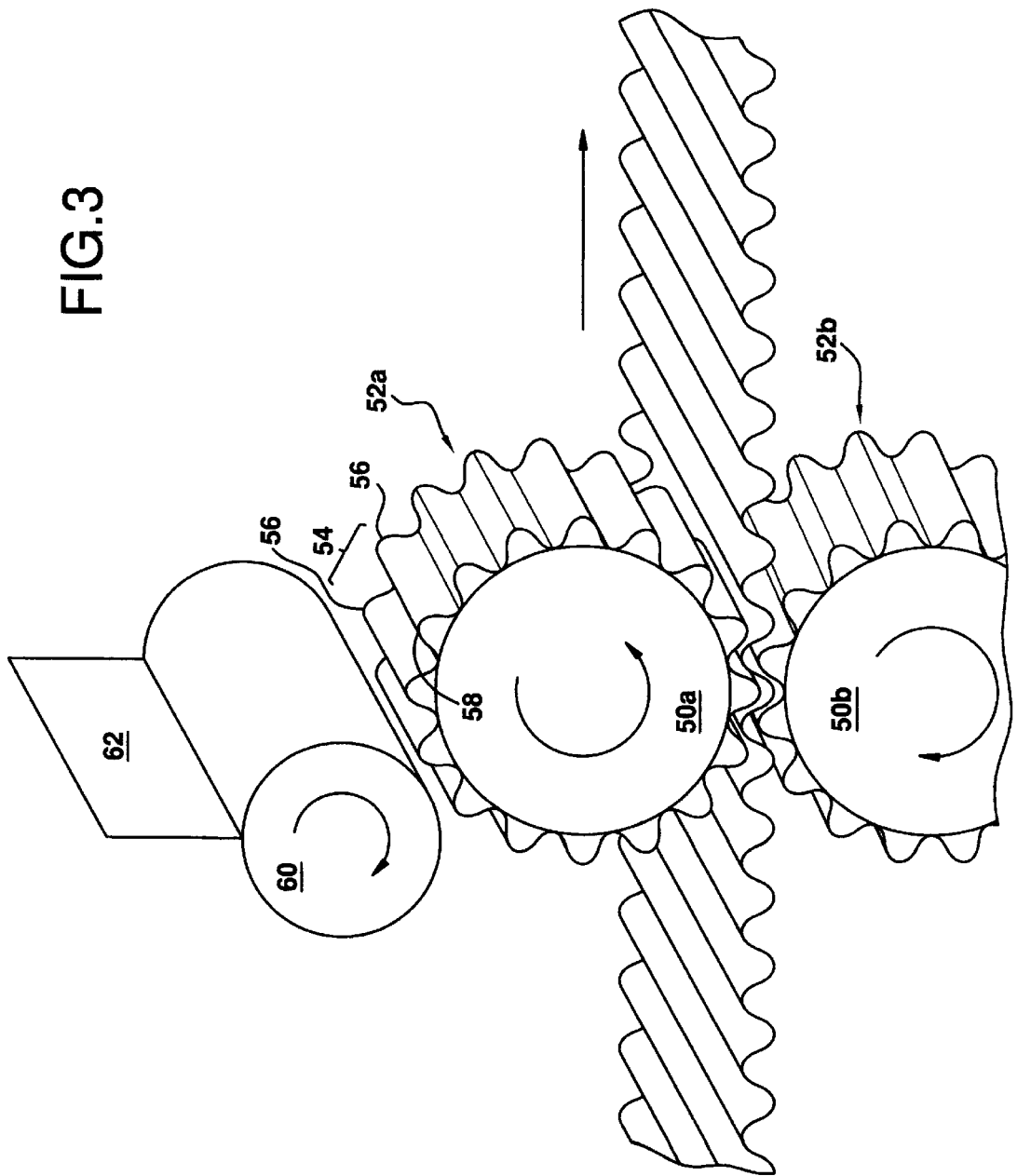
FIG. 3 is a perspective view of another embodiment of a roller assembly for applying a catalyst composition to a corrugated substrate.

An alternative embodiment of an against the grain roller assembly is shown in FIG. 3. In this embodiment, the surfaces of the respective primary rollers are provided with corrugations including spaced-apart projections and valleys therebetween which are complimentary to the shape of the corrugations of the substrate. The primary rollers are run transverse to the axis of the corrugations comprising the substrate (i.e. against the grain) so that the projections of the rollers fit within the valleys formed by the corrugations of the substrate.

More specifically, primary rollers 50a and 50b are provided with respective surfaces 52a and 52b formed in the shape of a corrugation 54 having a plurality of spaced-apart projections 56 defining valleys 58 therebetween. As the primary rollers 50a and 50b move transversely across the substrate, the projections 56 mate with corresponding valleys of the corrugations of the substrate. By employing upper and lower primary rollers 50a and 50b, both sides of the corrugated substrate may be coated with the catalyst composition.

The primary rollers 50a and 50b are provided with the slurry composition from a secondary roller 60 which ensures a uniform and continuous source of the composition through the optional use of a doctor blade 62. It should be understood, however, that the supply of the composition to the primary rollers 50a and 50b can be made by other methods including spraying and the like.

The materials used for the primary and secondary rollers in the embodiment of FIG. 3 may be the same as employed for the flat surface rollers shown in the embodiment of FIG. 2. The preferred material for the primary rollers 50a and 50b is nylon.

In another embodiment of the roller assembly in accordance with the present invention, coating takes place parallel to the longitudinal axis of the corrugations of the corrugated substrate (i.e. with the grain). The primary rollers are provided with a series of spaced-apart projections which are complimentary to the shape of the corrugations of the corrugated substrate. The primary rollers are moved in the direction of the axis of the corrugations of the substrate and have surfaces which contact the tops of the projections and the valleys of the corrugations of the substrate to provide a uniform coating of the composition.

Figure 4:
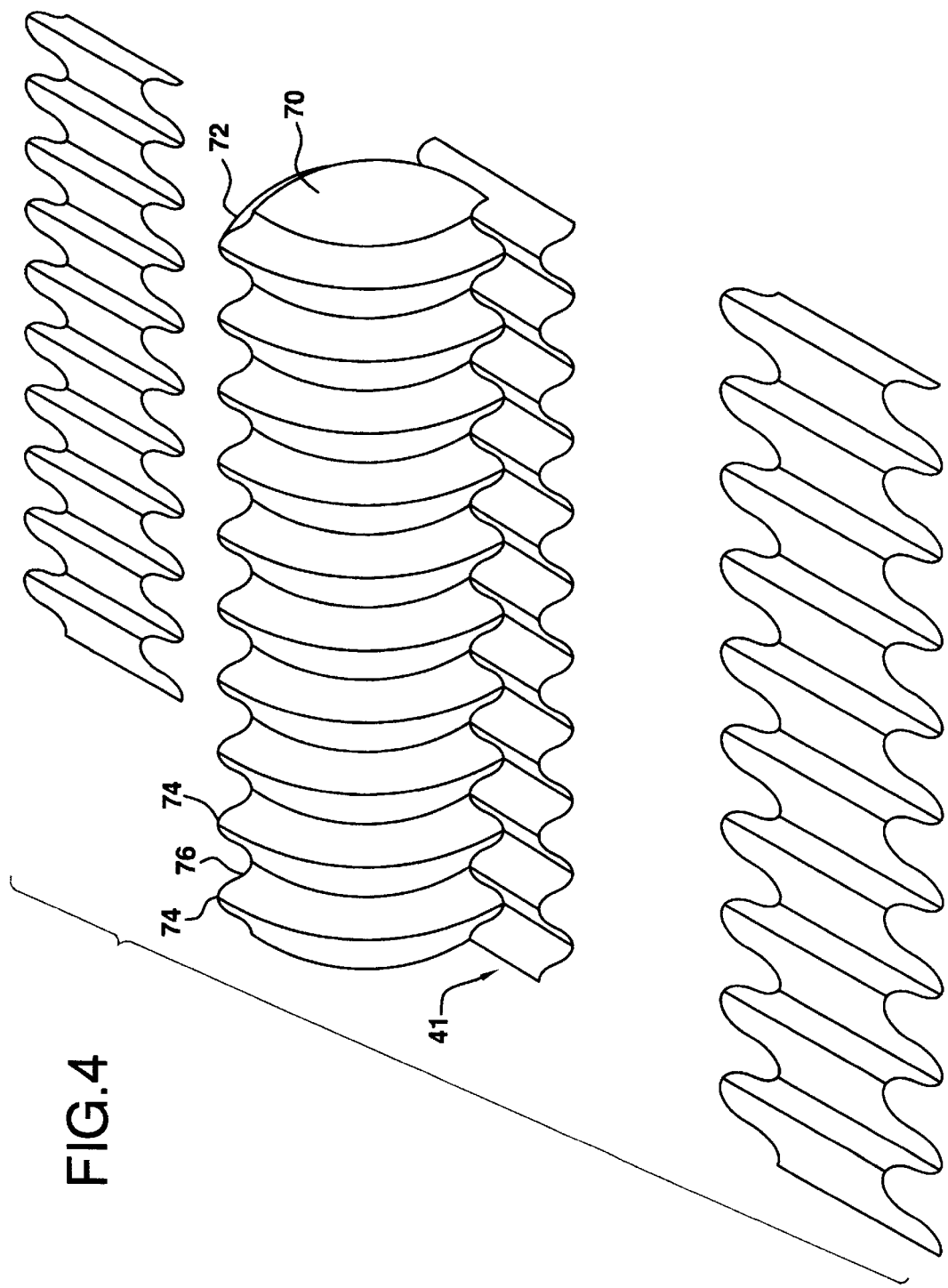
FIG. 4 is a perspective view of still another embodiment of a roller assembly for applying a catalyst composition to a corrugated substrate in accordance with the present invention.

Referring specifically to FIG. 4, a primary roller 70 is provided with a surface 72 having a plurality of spaced-apart projections 74. Defined between pairs of adjacent projections 74 is a valley 76. When in operation, the projections 74 of the primary roller 70 conform to the shape of the valley of the coated substrate. Similarly, the valleys 76 of rollers 70 conform to the shape of the projections of the corrugated substrate. In this way, the entire surface of the substrate may be uniformly coated with the composition.

The composition is provided to the primary roller 70 through a secondary roller, sprayer or the like (not shown) in the same manner as described above in connection with the embodiments of FIGS. 2 and 3. In the embodiment of FIG. 4, however, the roller 70 moves in the direction of the axis of the substrate corrugations to provide a coating on the surface of the substrate containing a catalyst or adsorbent composition. The coating is provided in a smooth uniform manner by the complimentary positioning of the corrugated roller and the corrugated substrate. It will be understood from the embodiment of FIG. 4 that a corresponding primary roller 70 can be placed below the surface of the corrugated substrate to coat the bottom surface of the substrate in the same manner as shown in the embodiment of FIGS. 2 and 3.

In a preferred form of the invention, the rollers shown in the grain of FIG. 4 may not precisely mate with corrugations of the substrate. This can lead to occasional high and low spots in the coating process. Imprecise mating can arise from differences in manufacturing tolerances of the substrate corrugations as well in the corrugations of the roller itself. It is therefore desirable to provide the roller assembly of the type shown in FIG. 5 with a device for ensuring that the rollers remain properly positioned within the substrate corrugations even when the corrugations modestly change dimensions, as for example due to manufacturing tolerances.

Referring to FIGS. 5 and 6, there is shown a spacing device which centers the primary rollers within the center of each substrate corrugation irrespective of whether there is a change in the width of any one or more corrugations. More specifically, each primary roller 70 is secured through a bar 80 and is rotatable thereon. The bar 80 should allow each primary roller to move laterally. This can be accomplished by applying a lubricant (e.g. oil, silicone and the like) to the bar 80 or through the use of ball bearings (not shown) or the like.

Positioned on the bar 80 between adjacent rollers 70 are spacers 82 which can be made of metal or plastic. The spacers 82 are movable laterally on the bar 80 through the use of a lubricant or bearings as described above for the primary rollers 70. The width of the spacers 82 is less than the distance between adjacent rollers such that the spacers 82 limit lateral movement of the roller 70 and maintain relative spacing of the primary rollers 70 as they pass along the corrugations of the substrate.

In a further embodiment of the invention relative movement of the spacers can be limited by the use of springs. Referring to FIG. 6, lateral movement of the spacers 82 can be limited by employing springs 84 on the bar 80 between the spacer 82 and adjacent primary rollers 70. The springs 84 limit the lateral movement of the spacers 82 and thereby limit the lateral movement of the primary rollers 70 as they proceed along the corrugations.

Further improvement in the positioning and movement of the primary roller can be obtained by using a guide wheel assembly of the type shown in FIGS. 7A and 7B. Referring to FIGS. 7A and 7B the primary roller 70 is positioned about the bar 80 as described above for the embodiments shown in FIGS. 5 and 6. A guide assembly 90 is attached to the bar 80 on both sides of the primary roller 70. The guide assembly 90 includes a connecting device 92 for connecting the guide assembly 90 to the bar 80. The connecting device 92 can be a ring which fits over the bar 80 or other suitable device.

The guide assembly 90 also includes opposed legs 94 which extend from the bar 90 forward of the primary roller 70. The legs 94 are attached to a wheel 96 through a connector 98 such as a bar or the like. The wheel 96 is positioned within the valley of a corrugation of the substrate and thereby guides the primary roller through the same valley.

In the embodiments shown in FIGS. 5–7B, the position of a primary roller 70 as it passes over the corrugation of the substrate is controlled through the use of spacers 82 and/or a guide assembly 90. In this way, the primary roller 70 proceeds through the corrugations in a uniform manner thereby providing a move uniform coating of the catalyst and/or adsorbent composition to the substrate.

The primary roller 70 shown in the embodiments of FIGS. 4–7B, like the rollers used in the embodiments of FIGS. 2 and 3, is preferably made of a soft pliant material that is capable of uniformly applying the catalyst composition and preferably has good wear resistance when used in this mode of operation. Preferred materials are the same as described previously in connection with the embodiment of FIG. 2. Such materials include shags, felt, synthetic foams and rubbers made from, for example, nylon, polyurethane, polyethylene, polypropylene and the like. The preferred material is nylon.

The catalyst and/or adsorbent composition as applied to the corrugated substrate may be applied as a single coat or in multiple coats. When multiple coats are employed, it is necessary to let the first coat dry before applying the next coat. The thickness of each coat may vary over a wide range depending on the composition but is generally in the range of from about 0.1 to 1,000 microns, preferably from about 1 to 100 microns, most preferably from about 15 to 60 microns. Multiple coatings are typically preferred to obtain improved adhesion and to simplify meeting target coatings.

The compositions that can be applied to a corrugated substrate in accordance with the present invention can vary widely and include aqueous systems and non-aqueous systems such as paints, lacquers and the like. The present invention has particular applicability for the formation of pollution treating devices.

Catalysts which may be included in the composition can vary widely but generally include precious metals such as platinum, palladium, rhodium and the like and/or base metals which include, for example, barium, strontium, rare earth metals and ceria and oxides thereof. Examples of such catalysts are described in U.S. Pat. No. 5,139,992, U.S. Pat. No. 5,254,519, and U.S. Pat. No. 5,212,142 each of which is incorporated herein by reference.

Adsorbent compositions are those which adsorb hydrocarbons, ozone or other pollutants commonly associated with automotive exhaust or ambient air. Such adsorbent materials are compositions which can include alkaline earth metal oxides, activated carbon, molecular sieves, especially zeolites, such as beta-zeolites and combinations thereof. Examples of such adsorbent compositions are disclosed in U.S. Pat. Nos. 4,985,210, 5,051,244 and 5,125,231, each of which is incorporated herein by reference.

The catalyst and/or adsorbent composition is prepared in the form of a slurry using water or other suitable liquid carriers to form a flowable slurry which can be imprinted using the above recited printing techniques.

The slurries are modified from standard compositions by changing the solids content. The slurries are adjusted to a solids content typically from about 16 to 35% with a pH between about 3.0 and 3.5. An acid (e.g. nitric acid) is used to adjust the pH. Viscosities are generally between about 30 and 100 centipose. Screen printing typically requires a high solids content (45 to 60% solids) and the addition of thickeners such as organic Methocel (processed starch) or peptizable alumina mixed in under high shear. These processes raise the slurry viscosity in the range of from about 500 to 5,000 centipose. Generally, the higher the viscosity the better control by screen printing. However, adhesion is generally better with low viscosity slurries.

EXAMPLE 1

Two six inch diameter rollers were covered with one-quarter inch polyester felt. The rollers were saturated with a catalyst composition containing the composition shown in Table 1 (30 percent solids, 70 centipoises (cp)).

TABLE 1

| COMPONENT | AMOUNT G/IN$^3$ |
|---|---|
| $Al_2O_3$ (150 m$^2$/g) | 0.75 |
| Ceria Stabilized Zirconia | 0.500 |
| $ZrO_2$ | 0.082 |
| Pt | 0.003 |
| Rh | 0.003 |
| TOP COAT | |
| Alumina (150 m$^2$/g) | 1.30 |
| $ZrO_2$ | 0.116 |
| BaO | 0.123 |
| $CeO_2$ | 0.066 |
| Pd | 0.081 |

Flat and corrugated steel foils were fed through the rollers' nip. The foils were then dried at 110° C. and fired to 550° C. A second coat of the catalyst composition was applied in the same manner.

A third coat was applied using 16 percent solids (35 cp) to reach loading target. After drying and firing a top coat of the catalyst composition was applied (16% solids, 35 cp). The samples were dried and fired as previously described. A second top coat of the same catalyst composition was applied to reach target loading.

Flat and corrugated foils were combined in a customary manner to make a 1"×3.5" honeycomb. The honeycomb was aged in an automotive exhaust stream for 25 hours using the N-Honda accelerated aging cycle at 850° C.

A hot engine operating at 750° to 900° C. and at stoichiometry conditions (air to fuel mixture adjusted to allow for only enough oxygen to completely combust all fuels) was vented through the catalytic converter or eight chamber reactor. The gas stream containing carbon monoxide, hydrocarbons, hydrogen, nitrogen oxides, carbon dioxide, oxygen, nitrogen, and water was passed through the catalyst. The amount of oxygen was sufficient to convert all of the combustibles to carbon dioxide and water. A spike of oxygen (e.g. 21% oxygen for 5 seconds) was introduced into the exhaust stream at given intervals. The cycle was then repeated for the number of hours desired (e.g. 25 hours). An eight chamber reactor is a metal cylinder that directs the exhaust gases through eight separate chambers that normally contain eight honeycomb core samples. Ports exist that allow for gas analysis for each sample.

The thus treated honeycomb was analyzed and found to contain 213 mg of palladium, 6.76 mg of rhodium and 6,47 mg of platinum.

EXAMPLE 2

Samples produced in accordance with Example 1 were contacted with an air/fuel mixture typical of automobiles as set forth in Table 2. Analysis was made of the percent conversion of the three most common pollutants in an air/fuel mixture, namely hydrocarbons, carbon monoxide and nitrogen oxides represented by the formula $NO_x$. The pollutants were converted principally to carbon dioxide and water. The results are shown in Table 2.

TABLE 2

| | Percentage Conversion | | |
|---|---|---|---|
| Air/Fuel Ratio | HC | CO | $NO_x$ |
| 14.25 | 69 | 34 | 96 |
| 14.35 | 75 | 54 | 97 |
| 14.45 | 81 | 75 | 98 |
| 14.55 | 91 | 94 | 86 |
| 14.65 | 89 | 95 | 35 |
| 14.75 | 88 | 94 | 14 |
| 14.85 | 88 | 93 | 1 |

As shown in Table 2, the honeycomb produced in accordance with the present invention converted significant amounts of the pollutants to harmless by-products.

EXAMPLE 3

A 305 screen mesh (305 threads per inch/) on a CPM (Critical Printing Module, designed and sold by Davis International of Rochester, N.Y.) was used for coating metal foils in accordance with the present invention. A small puddle of a catalyst composition of the same composition used in Example 1, having a viscosity of 200 cp was placed on the screen. The composition had a solids content of 35 to 45% based upon mass loss after heating to 1,000° C.

The screen was brought within half an inch of the metal foil. A doctor blade was manually drawn across the screen bringing the catalyst composition into contact with the foil and drawing the catalyst across the foil. The foil was dried in air and calcined at 550° C. The process was repeated using a 305 screen mesh, but using the same catalyst composition except having a 35% solids content and a viscosity of 100 cp. The samples were dried and fired as described above (35% solids 100 cp). One of the two foils was corrugated to approximately 500 cells per square inch and then combined with the flat foil to form a 1"×3.5" honeycomb. The sample was aged at 950° C. for 24 hours in nitrogen and 10 percent steam. The honeycomb samples were heated to 500° C. in a gas mixture containing carbon monoxide, propane, propene, nitrogen oxides, sulfur dioxide and steam and the percent conversion of hydrocarbons, carbon monoxide and $NO_x$ were made. The results are shown in Table 3.

TABLE 3

| | Percentage Conversion | | |
|---|---|---|---|
| TEMPERATURE | HC | CO | $NO_x$ |
| 220° C. | 8 | 1 | 8 |
| 250° C. | 40 | 25 | 40 |
| 280° C. | 85 | 65 | 73 |
| 310° C. | 86 | 75 | 77 |
| 340° C. | 87 | 80 | 79 |
| 370° C. | 88 | 85 | 81 |
| 400° C. | 89 | 87 | 83 |
| 430° C. | 90 | 89 | 84 |
| 460° C. | 91 | 90 | 85 |
| 490° C. | 92 | 90 | 84 |
| 520° C. | 93 | 90 | 86 |

As shown in Table 3, the honeycomb produced in accordance with the present invention converted significant amounts of the pollutants to harmless by-products.

EXAMPLE 4

Five sets of 20 sheets each of corrugated metal foil were coated with catalyst compositions described below. The corrugated metal foil was made of Alpha-IV metal containing 75% by weight iron, 20% by weight chromium, 5% by weight aluminum and 0.1% by weight cesium, manufactured by Allegheny Ludland. Each metal foil measured 3.5"×12" with an average corrugation depth of 0.044". The average repeat unit was 0.10610".

One third of the area of each sheet was coated with a single coat of a first catalyst composition and the remaining two-thirds of the sheets were covered with two coats of a second catalyst composition.

The first composition is set forth in Table 4.

TABLE 4

| FIRST COMPOSITION | | | |
|---|---|---|---|
| Components | Loading | Units | Mass Percentage |
| Alumina | 1.2300 | $g/ft^3$ | 66.7 |
| La2O3 | 0.1900 | $g/ft^3$ | 10.3 |
| Nd2O3 | 0.1600 | $g/in^3$ | 8.68 |
| SrO | 0.1000 | $g/in^3$ | 5.42 |
| $ZrO_2$ | 0.1000 | $g/in^3$ | 5.42 |
| Pd | 0.0637 | $g/in^3$ | 3.46 |

The top coat and bottom coats of the second catalyst composition are shown in Tables 5 and 6, respectively.

TABLE 5

| TOP COAT | | | |
|---|---|---|---|
| Components | Loading | Units | Mass Percentage |
| Pt | 2.0625 | $g/ft^3$ | 0.067 |
| Rh | 4.0625 | $g/ft^3$ | 0.132 |
| Alumina | 0.5 | $g/in^3$ | 28.1 |
| Ceria Stabilized Zirconia | 1.2 | $g/in^3$ | 67.4 |
| $ZrO_2$ | 0.075 | $g/in^3$ | 4.21 |

TABLE 6

BOTTOM COAT

| Components | Loading | Units | Mass Percentage |
|---|---|---|---|
| Pd | 56.88 | g/ft$^3$ | 1.67 |
| Pt | 2.00 | g/ft$^3$ | 0.0576 |
| Alumina | 1.00 | g/in$^3$ | 49.8 |
| Ceria Stabilized Zirconia | 0.50 | g/in$^3$ | 24.9 |
| La2O3 | 0.08 | g/in$^3$ | 3.98 |
| Nd2O3 | 0.10 | g/in$^3$ | 4.98 |
| ZrO$_2$ | 0.05 | g/in$^3$ | 2.49 |
| SrO | 0.25 | g/in$^3$ | 12.44 |

The first and second catalyst compositions were applied in the following manner. A roller assembly of the type shown in FIGS. 1 and 2 including two 6" diameter rollers covered with a ⅛" thick polyester felt cut to 2" width was employed. The rollers were obtained from Redtree Industries. The rollers were driven by an electric motor and a belt system adjustable to a coating speed of up to 100 ft/min. The rotary speed was set at 22.3 rpm equivalent to approximately 35 ft/min.

The rollers were positioned so that the rollers touched each other and then the pressure between the rollers was adjusted, if necessary, as the corrugated foils passed between the rollers. Coating of the corrugated foils proceeded by adjusting not only the distance between the rollers but also the amount of the coating composition between the rollers to maintain a small bead of the coating composition at the roller nip.

The amount of coating composition applied to the corrugated foils was also affected by the solids content. The loading of the first coating composition is shown in Table 4.

The first catalyst composition was applied in three passes of the roller assembly. The coating composition contained 29.5% solids for the first two passes and 16.5% solids for the third pass. The corrugated foils were coated one at a time and after each pass were placed in a drying oven at 110° C. until dry and then transferred into an oven preheated to 550° C. for 20 minutes.

The total amount of precious metal deposited for each coating for each group of 20 corrugated foils was measured and the results are shown in Table 7.

TABLE 7

| First Coating | Second Coating | Third Coating | Total |
|---|---|---|---|
| 4.79 | 6.3 | 3.32 | 14.41 |
| 4.92 | 6.35 | 4.08 | 15.35 |
| 4.77 | 6.03 | 3.10/2.46 | 15.86 |
| 4.74 | 6.59 | 3.61 | 14.95 |
| 4.49 | 6.26 | 4.03 | 14.78 |

The second catalyst composition was applied in a manner similar to that described above for the first catalyst composition with the following differences. The bottom coat of the second catalyst composition was applied in two passes, the first having a 30% solids content and the second and third having a 16.5% solids content. The amount of precious metal deposited for each coating for each group of 20 corrugated foils was measured and the results are shown in Table 8.

TABLE 8

| Set Number | First Coating | Second Coating | Third Coating | Total |
|---|---|---|---|---|
| 1 | 18.11 | 7.16 | 6.38 | 31.65 |
| 2 | 21.06 | 5.33 | 5.66 | 32.05 |
| 3* | 15.88 | 5.14 | 5.08/5.55** | 31.65*** |

*19 Foils instead of 20 foils.
**Fourth coat mass
***Scaled mass to 20 foils is 33.31 g.

The bottom coat was applied in the same manner as described above except that the bottom coat was applied in two passes, the first having a 30% solids content and the second a 16.5% solids content. The amount of the precious metal deposited for each coating for each group of 20 corrugated foils was measured and the results are shown in Table 9.

TABLE 9

| Set Number | First Coating | Second Coating | Total |
|---|---|---|---|
| 1 | 23.65 | 5.03 | 28.68 |
| 2 | 20.84 | 7.81 | 28.65 |
| 3 | 20.54 | 7.10 | 27.63 |

EXAMPLE 5

Samples of 1"×3.5" metal honeycomb of the type prepared in Example 1 having 400 cells per square inch was aged in a mixture of air and 10% by volume steam at 950° C. for 24 hours.

Thereafter the samples were tested in a reactor which received a gas composition containing 0.2% by volume carbon monoxide, 0.35% by volume oxygen gas, 235 ppm of each of propane and propene, 1400 ppm of NO$_x$, 45 ppm of sulfur dioxide, 10% by volume of steam and the balance nitrogen gas. The space velocity/hr. of the gas composition was 41,800. The temperature at which 50% and 75%, respectively of the hydrocarbons, carbon monoxide and NO$_x$ were converted to harmless compounds was measured and the results are shown in Table 10.

Table 10

| CO 50% Conversion | HC 50% Conversion | NO$_x$ 50% Conversion | CO 75% Conversion | HC 75% Conversion | NO$_x$ 75% Conversion |
|---|---|---|---|---|---|
| 253* | 265 | 255 | 265 | 311 | 294 |
| 254 | 265 | 256 | 268 | 300 | 278 |
| 257 | 266 | 258 | 269 | 307 | 284 |

Table 10-continued

|  | CO 50% Conversion | HC 50% Conversion | NO$_x$ 50% Conversion | CO 75% Conversion | HC 75% Conversion | NO$_x$ 75% Conversion |
|---|---|---|---|---|---|---|
|  | 246 | 257 | 247 | 259 | 288 | 266 |
| Average | 253 | 263 | 254 | 265 | 302 | 281 |

*°C.

COMPARATIVE EXAMPLE

Samples of a ceramic honeycomb having the same dimensions and cell density as employed in Example 5 were dip coated to apply the same catalyst compositions as used in Example 5. The samples were subjected to the same air/fuel mixture under the same conditions as the samples of Example 5 and the results are shown in Table 11.

TABLE 11

|  | CO 50% Conversion | HC 50% Conversion | NO$_x$ 50% Conversion | CO 75% Conversion | HC 75% Conversion | NO$_x$ 75% Conversion |
|---|---|---|---|---|---|---|
|  | 274* | 294 | 282 | 296 | 325 | 313 |
|  | 273 | 286 | 265 | 292 | 331 | 283 |
|  | 273 | 285 | 271 | 289 | 321 | 291 |
|  | 276 | 283 | 268 | 287 | 313 | 281 |
| Average | 274 | 287 | 271.5 | 291 | 322.5 | 292 |

*°C.

As shown by a comparison of the results in Tables 10 and 11, the samples coated with the roller assembly according to the present invention achieved the selected conversion rates at somewhat lower temperatures than the samples coated in the traditional dip coating manner.

What is claimed:

1. A method of forming a coating on a corrugated, textured, or dimpled substrate with a composition containing a catalyst or an adsorbent material comprising imprinting through use of a roller assembly, said composition upon the substrate to form said coating.

2. The method of claim 1 comprising forming a flexographic plate comprised of pitted and non-pitted areas, placing the composition in contact with the pitted areas to form an image thereon and transferring the image to said substrate.

3. The method of claim 1 comprising protecting a portion of the substrate, chemically etching an unprotected portion of the substrate and applying the composition to either the protected or unprotected portion of the substrate.

4. The method of claim 1 comprising treating the substrate to form electrically conductive zones thereon, applying an ionic bath solution to the substrate and applying the composition to the substrate.

5. The method of claim 1 comprising charging the composition under the influence of an applied electric field, charging the substrate with a polarity opposite to that of the composition and applying the composition to the substrate.

6. The method of claim 1 comprising carving an image into a portion of the substrate and applying the composition to the carved or non-carved portion of the substrate.

7. The method of 1 comprising forming hydrophobic and hydrophilic areas on a first substrate, applying the composition to the first substrate to form an image, transferring the image containing said composition to the corrugated, textured, or dimpled substrate.

8. A method of coating a corrugated substrate, having a surface comprising alternating peaks and valleys with a coating liquid comprising:

a) rotating a roller assembly over the corrugated substrate, said roller assembly comprising at least one primary roller conforming to the surface of the corrugated substrate which contacts the surface to thereby place the coating liquid thereon; and b) supplying the coating liquid to at least one primary roller.

9. The method of claim 8 wherein the coating liquid is selected from the group consisting of a catalyst composition, an adsorbent composition and combinations thereof.

10. A method of claim 8 comprising passing the roller assembly in a direction transverse to the longitudinal axis of the substrate's corrugations.

11. The method of claim 8 wherein the primary roller comprises a material selected from the group consisting of shag, felt, synthetic foam and rubber.

12. The method of claim 8 wherein the primary roller has a texture surface.

13. The method of claim 8 comprising supplying the coating liquid to the primary roller using a sprayer or a coating liquid supplying roller.

14. The method of claim 8 further comprising employing a secondary roller to contact the primary roller to supply a smooth, even distribution of the coating liquid to the primary roller.

15. The method of claim 8 comprising applying pressure to the primary roller of sufficient magnitude that the primary roller uniformly coats the substrate.

16. The method of claim 10 wherein the primary roller comprises spaced-apart projections with valleys therebetween defining a shape complimentary to the shape of the corrugations of the substrate, said method comprising passing the primary roller over the substrate so that the projections and valleys of the primary roller contact and thereby coat the corrugations of the substrate with the coating liquid.

17. The method of claim 8 comprising rotating the roller assembly in a direction along the longitudinal axis of the corrugations of the substrate, said roller assembly comprising at least one primary roller having a plurality of projections for rolling along corresponding valleys of the corrugated substrate.

18. The method of claim 17 further comprising controlling lateral movement of the primary roller as it travels in the direction parallel to the longitudinal axis of the corrugations.

19. The method of claim 18 further comprising positioning spacer means between adjacent primary rollers.

20. The method of claim 19 further comprising limiting the lateral movement of the spacer means.

21. The method of claim 20 comprising positioning spring means between the spacer means and the primary roller.

22. The method of claim 18 further comprising attaching a guide assembly to the primary roller, said guide assembly comprising a wheel fixedly positioned forward of the primary roller, said wheel being movable within the valley as the roller assembly is rotated.

23. Apparatus for applying a coating liquid to a surface of a corrugated substrate comprising:

a) a roller assembly comprising a primary roller which conforms to the surface of the corrugated substrate for contacting the surface to provide a uniform coating of the coating liquid thereon; and b) coating liquid supply means for supplying the coating liquid to the primary roller.

24. The apparatus of claim 23 wherein the primary roller is positioned transverse to the longitudinal axis of the corrugated substrate.

25. The apparatus of claim 23 wherein the primary roller is positioned in the direction of the longitudinal axis of the corrugated substrate.

26. The apparatus of claim 24 wherein the primary roller comprises a plurality of spaced-apart projections.

* * * * *